United States Patent [19]

Johnson, Jr.

[11] 4,107,752

[45] Aug. 15, 1978

[54] HIGH DENSITY MAGNETIC STORAGE DISC COMPRISING A SPIRAL OF MAGNETIC TAPE

[75] Inventor: Clark E. Johnson, Jr., Weston, Mass.

[73] Assignee: Micro Communications Corporation, Waltham, Mass.

[21] Appl. No.: 732,142

[22] Filed: Oct. 13, 1976

[51] Int. Cl.² .......................... G11B 5/012; G11B 5/82
[52] U.S. Cl. ........................................ 360/135; 360/97
[58] Field of Search ................ 360/135, 134, 86, 133, 360/97–99, 130

[56] References Cited

U.S. PATENT DOCUMENTS

| 907,383 | 12/1908 | Lieb | 360/135 |
|---|---|---|---|
| 1,940,274 | 12/1933 | Severy | 360/135 |
| 2,247,847 | 7/1941 | Pfleumer | 360/110 |
| 2,265,879 | 12/1941 | Thurm | 360/90 |
| 2,498,746 | 2/1950 | Walker | 360/130 |
| 2,509,012 | 5/1950 | Morrison | 360/135 |

Primary Examiner—Alfred H. Eddleman
Attorney, Agent, or Firm—Jacobs & Jacobs

[57] ABSTRACT

A magnetic storage disc for storing information comprises a spiral of magnetic tape supported edgewise on a disc having a flat bottom surface, one or both sides of the magnetic tape being available for recording information thereon.

7 Claims, 4 Drawing Figures

HIGH DENSITY MAGNETIC STORAGE DISC COMPRISING A SPIRAL OF MAGNETIC TAPE

The present invention relates to a system for storing date, and more particularly to storage of data on magnetic recording tape.

Magnetic information storage means come in basically two formats, magnetic tape and magnetic discs. Magnetic tape has the fundamental advantage of being able to store enormous quantities of data but, since it is in the form of a ribbon, searching for data requires that the tape be run between two spools. It is possible, of course, that the information being sought is at the end of the tape and therefore the entire reel of tape must be run through the machine. Random access is not feasible.

Magnetic discs, on the other hand, are flat platters in which the data are normally recorded in circumferential tracks. Recording and playback means either have multiple heads (one for each track) or a single head which is positioned radially over the track to be used. Clearly, in a single-head magnetic disc system the average time it takes to find a desired datum is simply the average time it takes to position the head plus the time for one-half of a revolution of the disc itself. Thus, information recorded on discs is much more readily accessible in a much shorter time than that recorded on tape, but the data storage capacity of magnetic discs is much less than that of magnetic tape.

There is thus a need in the art for a data storage system combining the desired features of discs and tape.

It is an object of the invention to provide a data storage system employing magnetic recording tape that is capable of random access to the information stored thereon.

It is another object of the invention to provide a random access data storage system capable of storing a large amount of information.

It is a further object of the invention to provide a data storage system of the type described in the form of a disc.

These and other objects are fulfilled by the present invention by the provision of a magnetic data storage disc, comprising a cylindrical base member having a substantially flat bottom surface and a flexible wall means joined to and projecting from the top surface thereof and arranged in a spiral coaxial with the cylindrical base member, adjacent convolutions of the spiral wall means being spaced from and out of contact with one another, at least one side of the wall means carrying a coating of magnetic recording material.

The present invention is illustrated in terms of a preferred embodiment in the drawing, in which.

Figure 1:
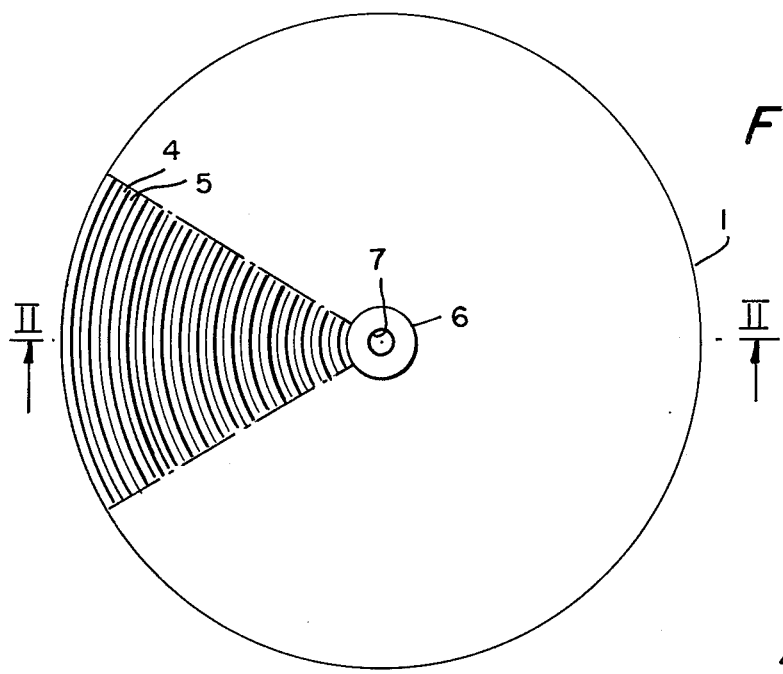
FIG. 1 is a plan view of a magnetic storage disc of the present invention.
Figure 2:
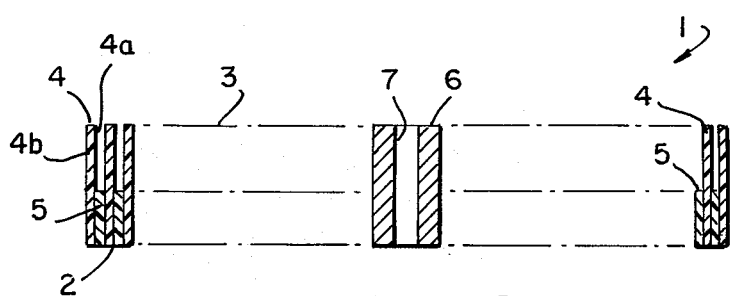
FIG. 2 is a view in section along lines II—II of FIG. 1.

Referring to FIG. 1, the data storage disc 1 has a substantially flat bottom surface 2 and a top 3 comprised of a spiral of plastic tape 4 carrying a coating of magnetic recording material on each side 4a and 4b. Between adjacent convolutions of the spiral 4 is a spiral of a plastic spacer 5. Spirals 4 and 5 are joined together in side-by-side relationship by cementing or the like. At the center of disc 1 is a spool 6 having a central bore 7, thus enabling the disc 1 to be mounted on a turntable for playback and recording.

Figure 3:
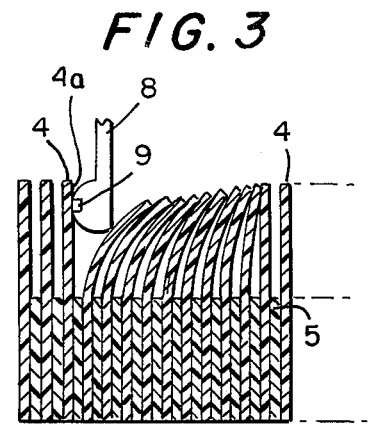
FIG. 3 is a schematic detail view in section in greatly enlarged scale of a magnetic head transducing the magnetic storage disc of the invention.

Playback and recording is schematically illustrated in FIG. 3. A magnetic transducer 8 having a narrow gap 9 is positioned in contact with side 4a of the spiral 4 at a desired location on the spiral 4. The convolution of magnetic tape 4 being transduced remains in the vertical position, while adjacent convolutions are flattened and pushed out of the way by head 8. The convolutions of the tape 4 are sufficiently flexible to bend under the action of head 8 and sufficiently resilient to snap back into place when head 8 is removed from contact therewith. When the disc 1 is rotated, the head 8 can record or playback information on the side 4a or 4b of the tape spiral 4, as is conventional. Head 8 is electrically connected to record and playback means (not shown).

Figure 4:
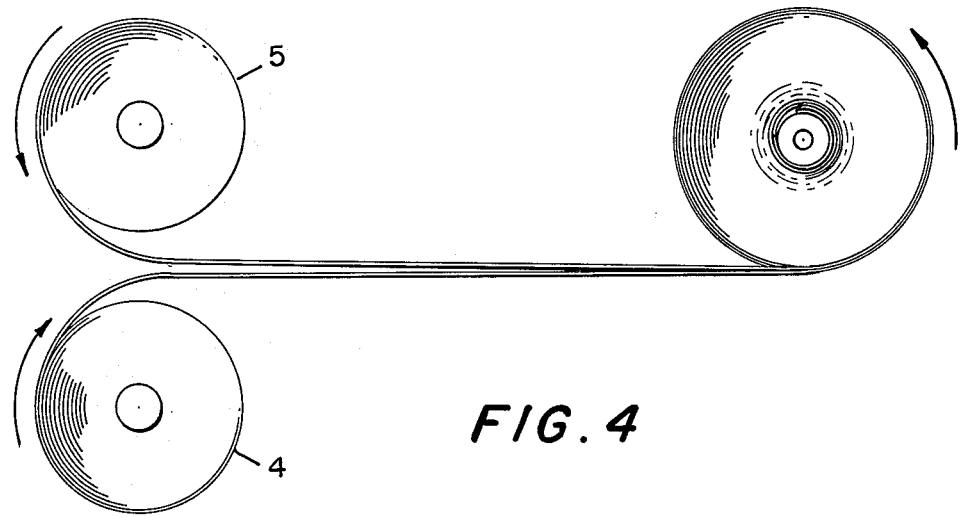
FIG. 4 is a schematic view illustrating a means for making the magnetic storage disc of the present invention.

FIG. 4 schematically illustrates a convenient method for making the data storage disc described above. As shown in FIG. 4, the data storage disc 1 is manufactured by winding a tape 4 carrying a coating of magnetic sound recording material, e.g. a conventional magnetic tape, together with a plastic tape 5 of less width than the magnetic tape in side-by-side relationship around a core 6. The magnetic tape 4 is suitably ¼ inch wide and the non-magnetic spacer tape 5 is suitably ⅛ inch wide, thereby allowing ⅛ inch of the magnetic tape 4 to protrude above the spacer tape 5. A suitable thickness of the spacer tape 5 is 3 mils while that of the magnetic tape 4 is 1 mil. The spacer tape is coated on both sides with a heat-sensitive adhesive so that after the tapes 4 and 5 are wound around the core 6 and heated, the tapes become fused into a solid mass, thereby providing considerable structural strength and rigidity.

Of course, the data storage disc 1 can utilize tape of other dimensions. For example, the spacer tape may preferably be from about 1 to about 10 mils thick and from about 1/16 inch to about ¼ inch wide and the magnetic tape may preferably be from about 1 to about 3 mils thick and from about ⅛ inch to about ¼ inch wider than the spacer tape to allow about ⅛ inch to about ¼ inch of the magnetic tape to protrude beyond the spacer tape, but other dimensions may be employed as the case may be. Both tapes can be made of any suitable material, but plastic is preferred from the standpoint of cost and freedom from maintenance. Polyester and Mylar are most preferred due to their excellent dimensional stability and resistance to tears and breaks. The coating of magnetic material may be any magnetic material capable of recording information now in use, the specific nature of the magnetic coating not being a specific feature of this invention.

The data storage capacity of the data storage disc of the present invention is enormous compared to conventional discs now in use. For a data storage disc of the invention having an outside diameter of 12 inches wound around a 3 inches diameter spool, where the thickness of the magnetic tape is 1 mil and the thickness of the spacer tape is 3 mils, the total length of the magnetic surface available for recording is approximately 2200 feet. At a recording density of 1600 flux changes per inch, a single track on the magnetic tape will hold over 40 million bits of data. By using a magnetic coating on both sides of the tape, the information density is doubled. In addition, with multiple tracks on the tape surface in approximately the same spacing as they are on a magnetic disc, that is, 200 tracks-per-inch, then the data storage disc of the invention would have a theoretical tape storage capacity in excess of 1.5 billion bits. Clearly, providing this enormous storage capacity in such a simple structure is a significant advance in the art.

Present magnetic recording head technology used both in video recording (analog signals) and digital recording (disc files) use very narrow tracks, on the order of 5 mils. Radial track positioning on flying heads from magnetic discs can position the head within 1 or 2 thousandths of an inch. Thus, radial positioning of a magnetic head on the data storage disc of the invention is readily achieved by using standard magnetic disc flying head techniques. This normally consists of a servo-controlled linear motor with a linear optical encoder for readout. The magnetic disc track provides the fine tune signal to position the head squarely on the track. In the instance of the invention described herein, the tracks are not circular, but rather spiralled. As a consequence, it is necessary to alter the servo control for the radial head positioning to incorporate this characteristic.

Magnetic disc heads can be made very thin using vaporcoated, batch-fabricating techniques. This manufacturing approach uses photo-etching techniques to fabricate very thin heads with consistent gap size and position. These techniques are readily adapted to provide a head of 1/16 inch (64 thousandths) thickness or less. A head of 1/16 inch thickness would flatten sixteen or less convolutions. If the head were made thin enough to fit between adjacent convolutions of magnetic tape, a two-head arrangement would be capable of reading either the front or the back of the tape.

To reproduce or record on a tape having more than one track on the tape, axial displacement and control of the head is carried out by means of a "loudspeaker" displacement system, as is well known in the art. In essence, axial displacement is controlled by mounting the head assembly to the cone of a loudspeaker, and the position of the head with respect to the tracks is controlled by the *dc* currents of the loudspeaker. This entire assembly must be as light as possible, since the entire assembly must be able to be positioned radially quickly.

The advantages of this system are:
1. Ease of manufacture using conventional materials;
2. Enormous storage capacities;
3. Head positioning (at least in the radial direction) using existing techniques;
4. Multiple tracks in the axial direction;
5. Random access of data;
6. Ability to record on both sides of the tape; and
7. Inexpensive manufacture.

What is claimed is:

1. A magnetic data storage disc, comprising a cylindrical base member having a substantially flat bottom surface and a flexible plastic wall means joined to and projecting from the top surface thereof and arranged in a spiral coaxial with the cylindrical base member, adjacent convolutions of the spiral wall means having a normal position in which they are spaced from and out of contact with one another, at least one side of the wall means carrying an exposed coating of magnetic recording material for magnetically recording therein at least one track of information, said wall means being sufficiently flexible and resilient to be deflected from said normal position upon application of a deflecting force thereto and to return to said normal position upon removal of said force.

2. The magnetic data storage disc according to claim 1, wherein both sides of the plastic wall means carry a coating of said magnetic recording material.

3. The magnetic data storage disc according to claim 1, wherein said base member has a bore through the center thereof, the spiral wall means extending from the circumference of the top surface to the central bore.

4. The magnetic data storage disc according to claim 1, wherein said wall means is from about ⅛ inch to about ¼ inch high.

5. A magnetic data storage disc, comprising first and second coils of flexible plastic tape laminated together in coaxial spirals with the convolutions of one tape coil alternating in side-by-side relationship with the convolutions of the other, a first portion of the convolutions of one tape coil being in contact with and joined to the adjacent convolutions of the other tape coil along the entire length of the coils and the remaining portion thereof having a normal position in which it is out of contact with convolutions of both tape coils, said remaining portion of said first tape carrying an exposed coating of magnetic recording material for magnetically recording therein at least one track of information, said first tape being sufficiently flexible and resilient to enable said remaining portion to be deflected from said normal position upon application of a force thereto and to return to said normal position upon removal of said force.

6. The magnetic data storage disc according to claim 5, wherein said remaining portion is from about ⅛ inch to about ¼ inch wide.

7. The magnetic data storage disc according to claim 6, wherein both sides of said remaining portion of the first tape carry said exposed coating of magnetic recording material.

* * * * *